(12) United States Patent
Littlefield et al.

(10) Patent No.: US 10,670,057 B2
(45) Date of Patent: Jun. 2, 2020

(54) CLAMP WITH AT LEAST ONE RETRACTABLE ARM

(71) Applicants: Wendi Littlefield, Washington, DC (US); Jeffrey Hartnett, Burlington, VT (US)

(72) Inventors: Wendi Littlefield, Washington, DC (US); Jeffrey Hartnett, Burlington, VT (US)

(73) Assignee: BRA PADLOCKERS LLC, Wilmington, DE (US)

( * ) Notice: Subject to any disclaimer, the term of this patent is extended or adjusted under 35 U.S.C. 154(b) by 0 days.

(21) Appl. No.: 16/405,915

(22) Filed: May 7, 2019

(65) Prior Publication Data

US 2019/0345960 A1    Nov. 14, 2019

Related U.S. Application Data

(60) Provisional application No. 62/668,533, filed on May 8, 2018.

(51) Int. Cl.
    *F16B 2/10*    (2006.01)
(52) U.S. Cl.
    CPC ...................... *F16B 2/10* (2013.01)
(58) Field of Classification Search
    CPC ....................................................... F16B 2/10
    See application file for complete search history.

(56) References Cited

U.S. PATENT DOCUMENTS

| 4,536,924 | A |   | 8/1985  | Willoughby |
| 5,159,730 | A |   | 11/1992 | Radvin |
| 5,361,463 | A |   | 11/1994 | Revis |
| 5,440,791 | A |   | 8/1995  | Guio |
| 5,595,331 | A |   | 1/1997  | Leistner |
| 5,896,624 | A |   | 4/1999  | Horswell |
| 5,944,236 | A |   | 8/1999  | Cinque |
| 5,988,577 | A |   | 11/1999 | Phillips |
| 6,612,000 | B2 |  | 10/2003 | Housley |
| 8,069,864 | B2 | * | 12/2011 | Chininis .................. A45D 8/20 132/277 |

(Continued)

FOREIGN PATENT DOCUMENTS

DE    4030120 A1    3/1990
JP    5235931 B2    7/2013

*Primary Examiner* — Robert Sandy
*Assistant Examiner* — David M Upchurch
(74) *Attorney, Agent, or Firm* — American University Washington College of Law

(57) ABSTRACT

A shell having a first shell portion and a second shell portion. A first and second claiming surface may be disposed at an end of the first and second shell portions respectively. The first arm and the first shell portion may include a first outer surface. The first arm may include a first arm non-extended position. The first arm may extend away from the first shell portion when in a first arm extended position. The second arm may extend away from the second shell portion when in a second arm extended position. The first shell portion may be disposed to the second shell portion such that the first clamping surface and the second claiming surface separate in response to an external force applied to the first arm in the first arm extended position and the second arm in the second arm extended position.

19 Claims, 19 Drawing Sheets

(56) References Cited

U.S. PATENT DOCUMENTS

| | | | | |
|---|---|---|---|---|
| 2003/0182773 A1* | 10/2003 | Ellwood | ............... | F16B 2/10 |
| | | | | 24/334 |
| 2004/0216286 A1* | 11/2004 | Dixon | ............... | B25B 5/08 |
| | | | | 24/536 |
| 2007/0175002 A1* | 8/2007 | Joe | ............... | B42F 1/006 |
| | | | | 24/67.5 |
| 2009/0260199 A1* | 10/2009 | Nashief | ............... | A41F 17/02 |
| | | | | 24/499 |
| 2017/0120664 A1* | 5/2017 | Klein | ............... | F16B 45/02 |

* cited by examiner

```
┌─────────────────────────────────────────────────────────────┐
│  Rotate the first arm into the first arm extended position  │
│  and the second arm into the second arm extended position   │
│                          1810                                │
└─────────────────────────────────────────────────────────────┘
                              │
                              ▼
┌─────────────────────────────────────────────────────────────┐
│  Apply an external force to the first arm and second arm to │
│  separate the first clamping surface from the second        │
│                      clamping surface                        │
│                          1820                                │
└─────────────────────────────────────────────────────────────┘
                              │
                              ▼
┌─────────────────────────────────────────────────────────────┐
│   Insert a material between the first clamping surface and  │
│                 the second clamping surface                  │
│                          1830                                │
└─────────────────────────────────────────────────────────────┘
                              │
                              ▼
┌─────────────────────────────────────────────────────────────┐
│                  Release the external force                  │
│                          1840                                │
└─────────────────────────────────────────────────────────────┘
                              │
                              ▼
┌─────────────────────────────────────────────────────────────┐
│  Rotate the first arm into the first arm non-extended       │
│  position and the second arm into the second arm            │
│                   non-extended position                      │
│                          1850                                │
└─────────────────────────────────────────────────────────────┘
```

CLAMP WITH AT LEAST ONE RETRACTABLE ARM

CROSS-REFERENCE TO RELATED APPLICATIONS

This application claims the benefit of U.S. Provisional Application No. 62/668,533 filed May 8, 2018, which is hereby incorporated by reference in its entirety

BRIEF DESCRIPTION OF THE SEVERAL VIEWS OF THE DRAWINGS

Non-limiting examples of embodiments of the disclosure are described below with reference to figures attached hereto that are listed following this paragraph. Similar structures, elements or parts that appear in more than one figure are generally labeled with a similar numeral in other figures in which they appear. Dimensions of components and features shown in the figures are chosen for convenience and clarity of presentation and are not necessarily shown to scale.

FIG. 18 is a flow diagram of a method of using a clamp as per an aspect of a disclosed embodiment.

DETAILED DESCRIPTION OF EMBODIMENTS

Example embodiments are generally directed to a clamping device. The device may be employed, for example, to clamp materials with minimal damage. The device may be employed, for example, to keep the removable paddings in sports bras in place when the bra is washed or dried in a washing or drying machine. The device may be employed, for example, to hang tapestries and/or art. The device may be employed, for example, to secure rare and/or delicate documents. The device may be employed, for example, to align pieces of metal and/or wood during manufacture or repair.

A common feature in sports bras and garments containing built-in bras are oval-shaped bra liners or pads. The bra liners may be removed through a small slit in the bra lining Apparel makers suggest removing the pads before laundering the item. Removing the liners may require a time-consuming extra step to wash and dry the pads separately. In addition, the pads may not be well constructed and may not hold up well to wear and tear outside the bra cavity. It may be difficult to reinsert the liners into the bra. Positioning the pads without wrinkles and with proper centered placement may be nearly impossible. Leaving the liners inside the bra in the laundry may not be better. The bra liners may slip out, bunch up, or otherwise get displaced during the laundry cycle, requiring the same struggle to properly reposition them within the bra before the next wearing. Embodiments disclosed herein may solve this everyday laundry problem. An embodiment may be constructed specifically to keep bra pads in place inside both the washing and drying machine.

Figure 1:
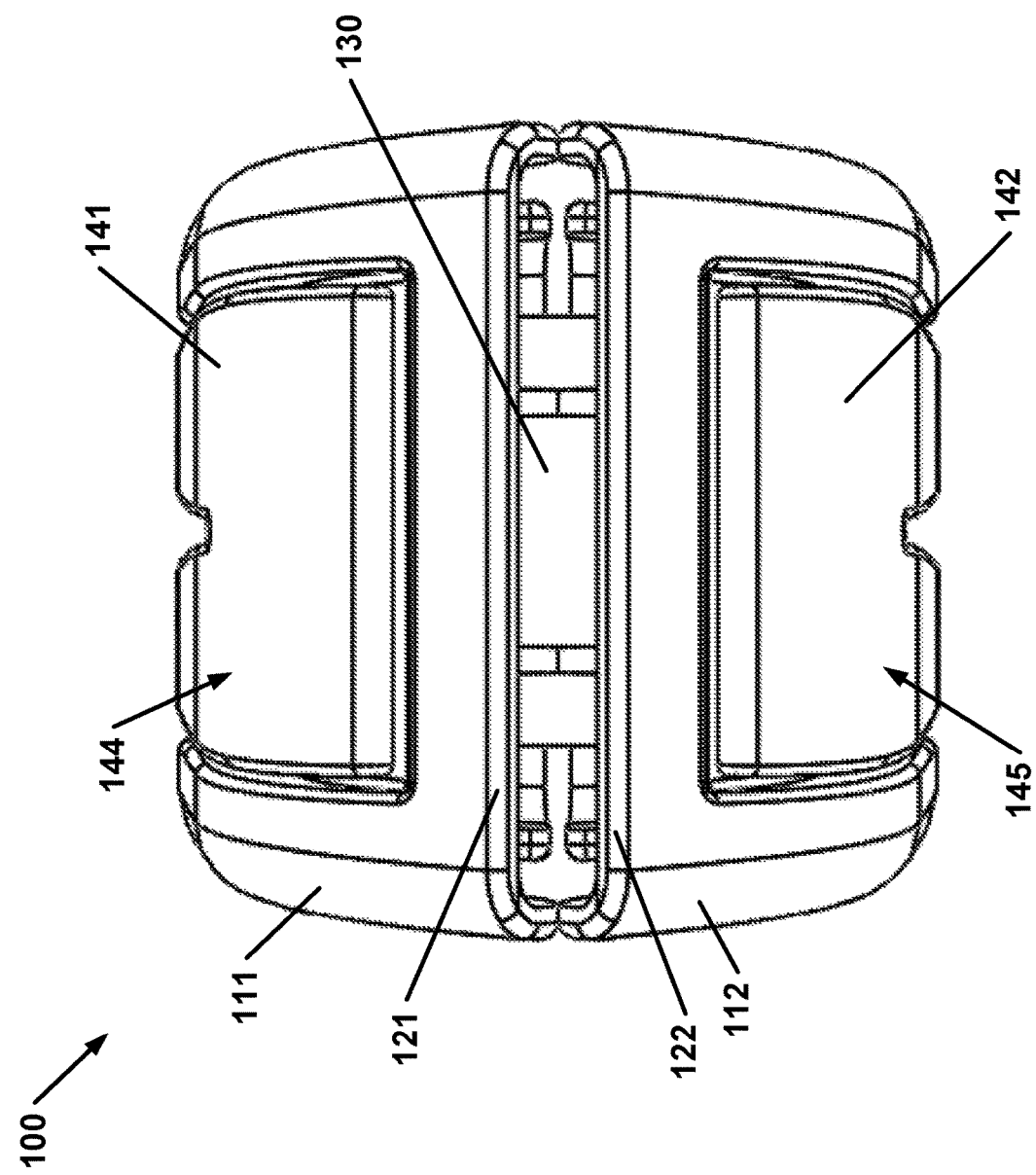
FIG. 1 is a front view of an example clamp showing a first clamping surface, a second clamping surface, and a first arm and a second arm in a non-extended position as per an aspect of a disclosed embodiment.

FIG. 1 illustrates an example clamp that may be employed, for example, to hold paddings in sports bras in place when the bra is washed or dried. Clamp 100 may be configured to hold, for example, an athletic bra or built-in bra containing garment liner in place during laundry cycles. According to an embodiment, the clamp 100 may be configured as a clip, a brace, a clasp, a grip, a vice, a fastener, a combination thereof, and/or the like. The clamp 100 may have a first arm 141 and a second arm 142 that may rotate outwards to facilitate separating the first clamping surface 121 and the second clamping surface 122. Once open, the clamp 100 may be inserted onto, for example, the bra and/or built in bra-containing garment to hold the bra liner in place. The clamp 100 may have a first clamping surface 121 and a second clamping surface 122 of sufficient depth and width to cover a sizeable portion of the bra's pocket. An internal spring 130 may provide an internal force 181 to keep the clamp 100 in place during the laundry cycle. Once in place, the first arm 141 and the second arm 142 may rotate inwards to recess in the first shell portion 111 and the second shell portion 112 respectively to create a single integrated surface without protrusions from the shell. This single integrated surface may protect material in a laundry cycle and may reduce the overall footprint of the clamp 100 during laundry cycles. The outer surface of the clamp 100 may be configured to be visually appealing and to prevent snagging or hooking on other garments during the laundry cycle, or hands of a user during use.

According to an embodiment, a clamp 100 may comprise multiple parts. An embodiment of clamp 100 may comprise a shell 110, a spring 130, a first arm 141, and a second arm 142. According to an embodiment, the spring 130 may be enclosed on the top and bottom by a composite plastic shell 110. According to an embodiment, the shell 110 may be connected to the spring 130 via, for example, a tab, which may be integrated into the shell 110. According to an embodiment, a first clamping surface 121 and a second clamping surface 122 may provide the garment clamping surface. According to an embodiment, an arm may connect to each of the first shell portion 111 and second shell portion 112 via holes in the shell 110, and integrated pins (for example, pivotal connector 161, pivotal connector 162, pivotal connector 163, pivotal connector 164). The first arm 141 and the second arm 142 may rotate out to stand out from the surface of a shell 110, and may rotate back in, to be recessed within the shell 110.

The shell 110 may comprise a portion of the device where spring 130, first arm 141, and/or second arm 142 are attached. The shell 110 may comprise a first shell portion 111, a first clamping surface 121, a second shell portion 112, and a second clamping surface 122. The shell 110 may be configured to come in contact with, for example, a garment. The shell 110 may comprise at least one tab (for example, tab 151, tab 152, tab 153 and/or tab 154) configured to hold the spring 130 in contact with the shell 110. The shell 110 may comprise at least one piece. The shell 110 may comprise one or more materials, such as for example: plastic, carbon, metal, wood, rubber, combinations thereof, and/or the like. According to an embodiment, the outer portion of the shell 110 may be softer than an inner portion of the shell 110.

The first shell portion 111 and the second shell portion 112 may be substantially similar. Substantially similar means that the first shell portion 111 and second shell portion 112 may appear identical and/or may be complimentary pieces with respect to shape, dimension, size, and material. Substantially similar may also include pieces that comprise similar functionality within the overall device. The first shell portion 111 may comprise plastic, carbon, metal, wood, rubber, combinations thereof, and/or the like. The second shell portion 112 may comprise plastic, carbon, metal, wood, rubber, combinations thereof, and/or the like. The first shell portion 111 and the second shell portion 112 may comprise at least one piece. The one piece may comprise variations in density. The one piece may comprise variations in thickness. Variation in the one piece may be configured to allow predetermined movement between the first shell portion 111 and the second shell portion 112.

The first shell portion 111 may be disposed to the second shell portion 112 using a connection portion. The connection portion may allow the first shell portion 111 and the second shell portion 112 to move from a first clamping position to a second clamping position when an external force 182 is applied. The connection portion may be solid. The connection portion may comprise multiple pieces. The connection portion may comprise a hinge. The connection portion may comprise, for example, a spring 130, a flexible portion, a pin, a combination thereof, and/or the like. The shell 110 may comprise one member where the flexible portion connects the first shell portion 111 and the second shell portion 112.

The first clamping surface 121 may be disposed at a first end of the first shell portion 111. The second clamping surface 122 may be disposed at a second end of the second shell portion 112. At least one of the first clamping surface 121 and second clamping surface 122 may comprise rubber, plastic, silicone, metal, a combination thereof, and/or similar materials. The first clamping surface 121 and the second clamping surface 122 may be the portion of the device configured to come in direct contact with, for example, clothing when the device is utilized. The first clamping surface 121 and the second clamping surface 122 may be manufactured to mitigate damage to, for example, a garment. For example, first clamping surface 121 and the second clamping surface 122 may be manufactured with materials comprising chemicals that will not react negatively to the garment. For example, first clamping surface 121 and the second clamping surface 122 may be manufactured to avoid sharp edges that may damage a garment. For example, first clamping surface 121 and the second clamping surface 122 may be manufactured to avoid dyes that may color a garment.

An internal force 181 may urge the first clamping surface 121 toward the second clamping surface 122. The source of the internal force 181 may be a spring 130, an elastic member, the mechanical resistance of the shell, or a combination thereof. A source of the internal force 181 may be enclosed by the first shell portion 111 and the second shell portion 112.

According to an embodiment, the spring 130 may contact the shell 110. The spring 130 may be affixed to the first shell portion 111 and/or the second shell portion 112 by the use of tabs, mounts, screws, adhesive, bolts, combination thereof, and/or the like. The spring 130 may also be structurally configured to attach to the shell 110 by spring mounts that allow the spring 130 to move within the mount when the device is employed. The spring 130 in contact with the shell 110 may be structurally configured to apply an internal force 181 to urge the first clamping surface 121 towards the second clamping surface 122.

According to an embodiment, the spring 130 may comprise a leaf spring, a compression spring, a torsional spring, and/or any combination of the like. According to an embodiment, the leaf spring may comprise a single piece. According to an embodiment the spring 130 may comprise a material such as, but not limited to: metal, carbon, plastic, rubber, wood, and/or any combination of the like. The spring 130 may exert sufficient internal force 181 to hold the desired articles of clothing together while being washed or dried in a washing or drying machine, while keeping for example the fabric of the clothing undamaged. In an embodiment of the device, the spring 130 may be comprised by the shell 110. In an example, the internal force 181 may be caused by an elastic member or the mechanical resistance of the shell 110. In yet another example, the internal force may be the result of a spring 130, an elastic member, the mechanical resistance of the shell 110, and/or any combination of the like.

A component of an embodiment may comprise a sheet metal leaf spring. The geometry and material may be configured to provide a compact footprint, while providing enough internal force 181 to hold, for example, the bra liner and/or pad in place during the various cycles and conditions encountered by a garment during a laundry cycle. The use of a sheet metal leaf spring may reduce damage to sensitive materials. The shell 110 may provide a multitude of functions. The shell 110 may enclose the spring 130. The shell 110 may protect a user and garment from the sharp metal edges. The shell 110 may provide a first clamping surface 121 and a second clamping surface 122 that clamp the garment. The shell 110 may prevent the garment from slipping during the laundry cycle. The first clamping surface 121 and the second clamping surface 122 may be long and wide enough to adequately secure the bra liner in place. The shell 110 may have holes for connection to the first arm 141 and the second arm 142. The first arm 141 and second arm 142 may rotate to stand out from the surface of a shell 110 of the clamp 100. The first arm 141 and the second arm 142 may provide a surface to grab the clamp 100 with, for example, a finger and a thumb. The first arm 141 and the second arm 142 may be positioned to have mechanical advantage to open the leaf spring 130. When the user applies an external force 182 the first arm 141 and/or the second arm 142, the first clamping surface 121 and the second clamping surface 122 may separate, and the clamp 100 may be installed onto the garment. After terminating the external force 182, the first clamping surface 121 and the second clamping surface 122 may work with the clamp 100 to secure the bra liner in place. Before placing the garment in the washing or drying machine, the first arm 141 and the second arm 142 may be rotated inwards to recess within the shell 110. This may reduce the space taken up by the clamp.

At least one of the first arm 141 and second arm 142 may comprise a material such as, but not limited to: plastic, carbon, metal, wood, rubber, combinations thereof, and/or the like. The first arm 141 may comprise at least one position. The first arm 141 may comprise a first arm extended position 146 and a first arm non-extended position 144. Examples of the first arm extended position 146 are shown, for example, in FIG. 7, FIG. 8, FIG. 9, FIG. 10, FIG. 11, FIG. 12, FIG. 13A, and FIG. 13B. Examples of the first arm non-extended position 144 are shown in FIG. 1, FIG. 2, FIG. 3, FIG. 4, FIG. 5, and FIG. 6. The first arm 141 may be pivotably connected at pivotal connection 161 and 162 to the first shell portion 111. The first arm 141 may be pivotably connected to the first shell portion 111 by a pivotal connection 161 and 162, such as a pin or hinge, affixed to the first arm 141 and the first shell portion 111. The pivotal connection (for example, pivotal connection 161 and/or pivotal connection 162) may allow the first arm 141 to rotate outward from the first shell portion 111.

According to an embodiment of the present disclosure, the first arm 141 and the first shell portion 111 may be attached with at least one arm pin. According to an embodiment of the present disclosure, the second arm 142 and the second shell portion 112 may be attached with at least one arm pin. The arm pin(s) may comprise stainless steel, wood, plastic, titanium, rubber, a combination thereof, and/or the like. According to an embodiment of the present disclosure, the first arm 141 and the first shell portion 111 may be attached with a hinge. According to an embodiment of the present disclosure, the second arm 142 and the second shell portion 112 may be attached with a hinge.

The first arm 141 may move from the first arm non-extended position 144 to the first arm extended position 146 by rotating around the pivotal connections (for example, 161, 162, 163, and/or 164) as shown by first arm movement 172. The second arm 142 may move from the second arm non-extended position 145 to the extended position 147 by rotating around the pivotal connections (for example, 161, 162, 163, and/or 164) as shown by second arm movement 176.

Figure 2:
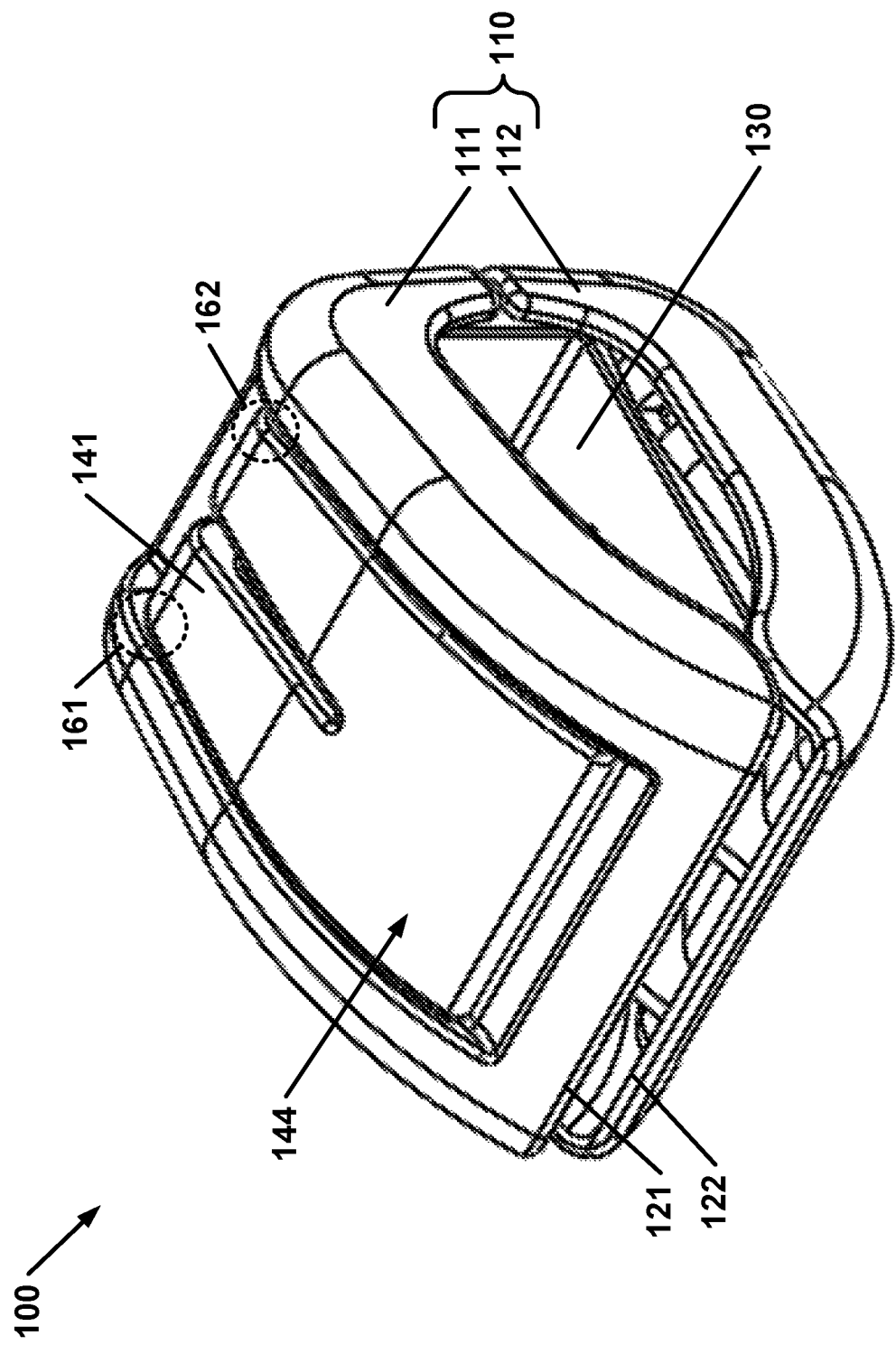
FIG. 2 is an isometric side view of an example clamp showing a first clamping surface, a second clamping surface, and a first arm in a non-extended position as per an aspect of a disclosed embodiment.
Figure 3:
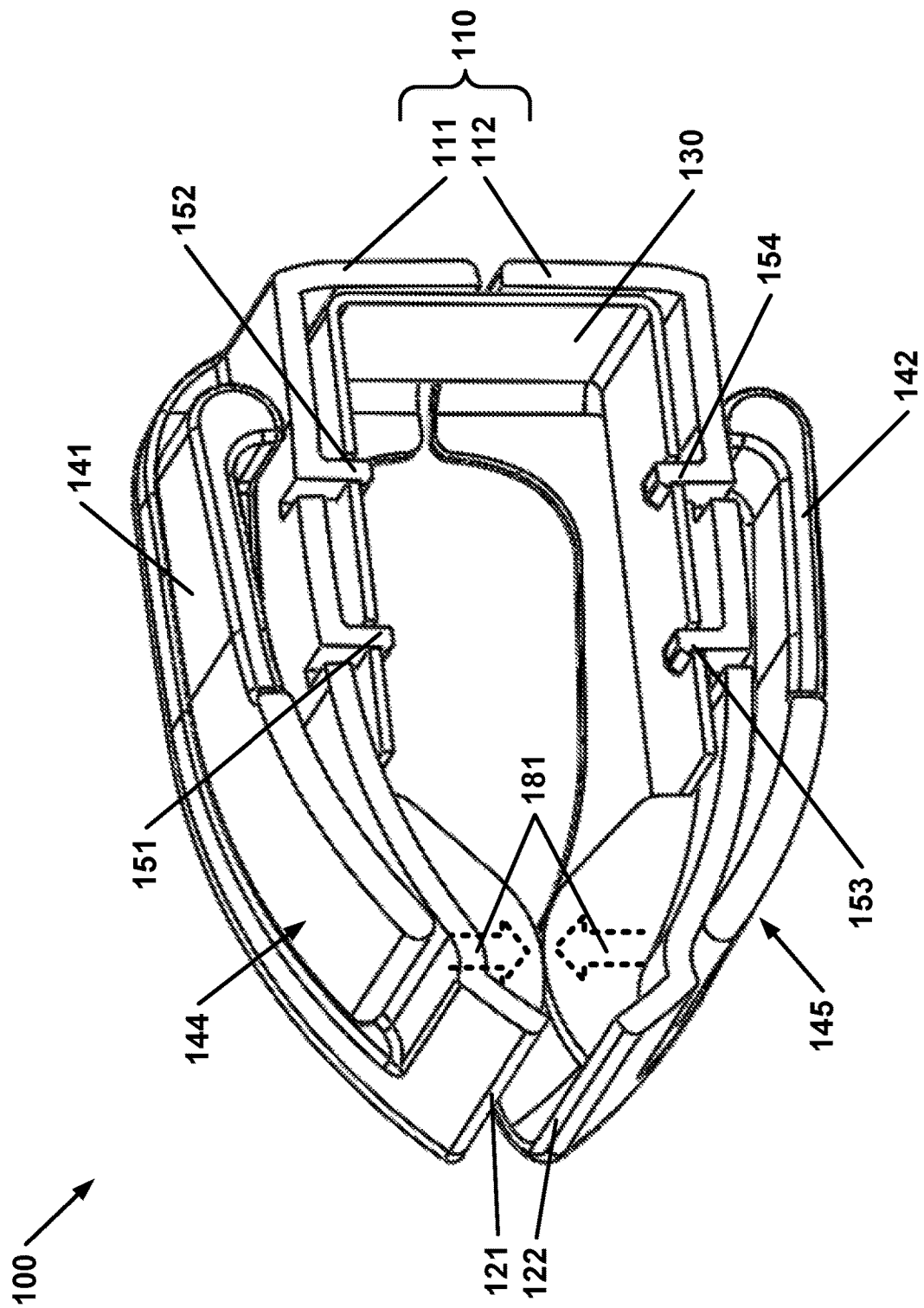
FIG. 3 is an isometric side, cross-section view of an example clamp showing a first clamping surface, a second clamping surface, a shell, and a first arm and a second arm in a non-extended position as per an aspect of a disclosed embodiment.
Figure 4:
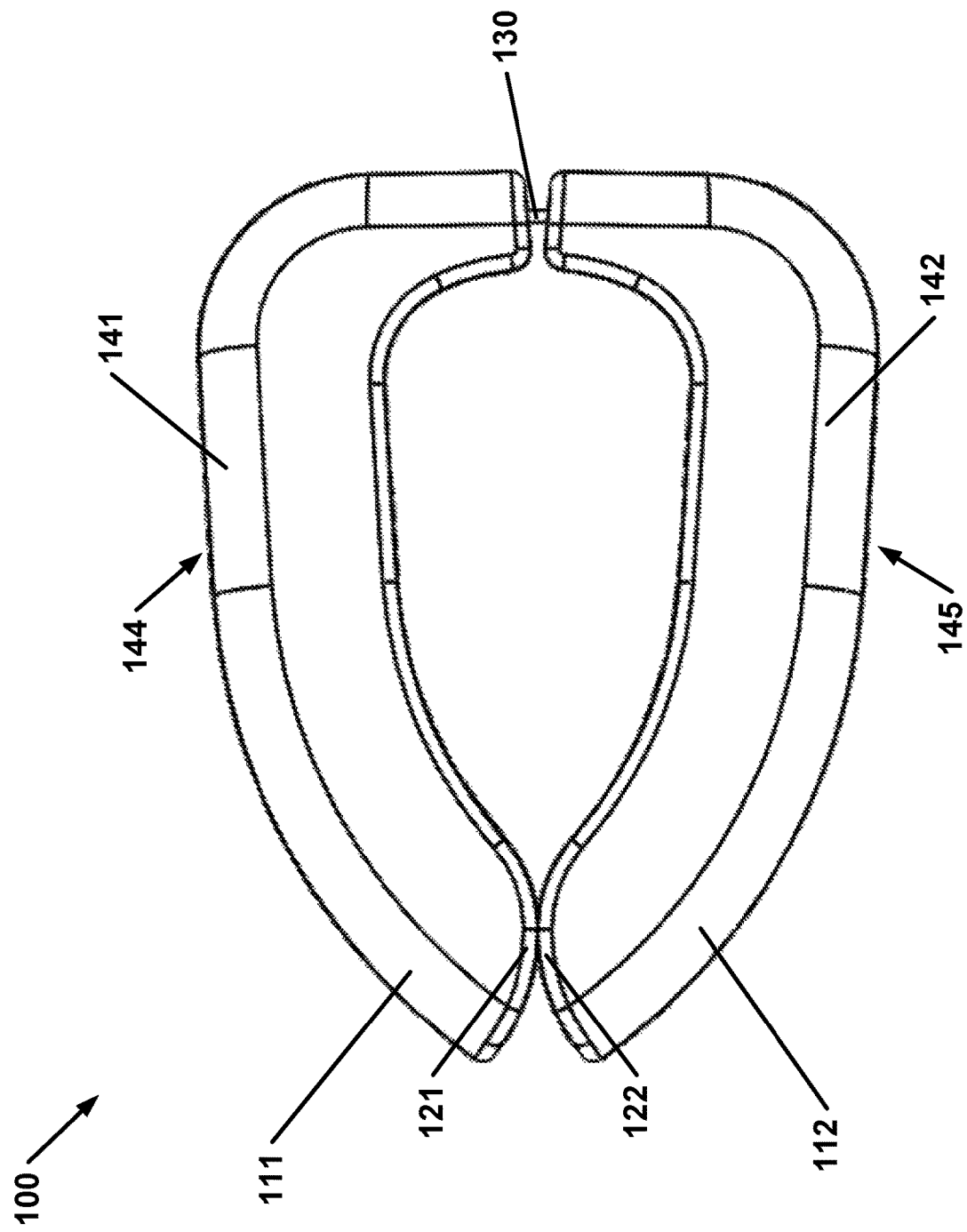
FIG. 4 is a side view of an example clamp showing a first clamping surface, a second clamping surface, ad a shell, and a first arm and a second arm in a non-extended position as per an aspect of a disclosed embodiment.
Figure 5:
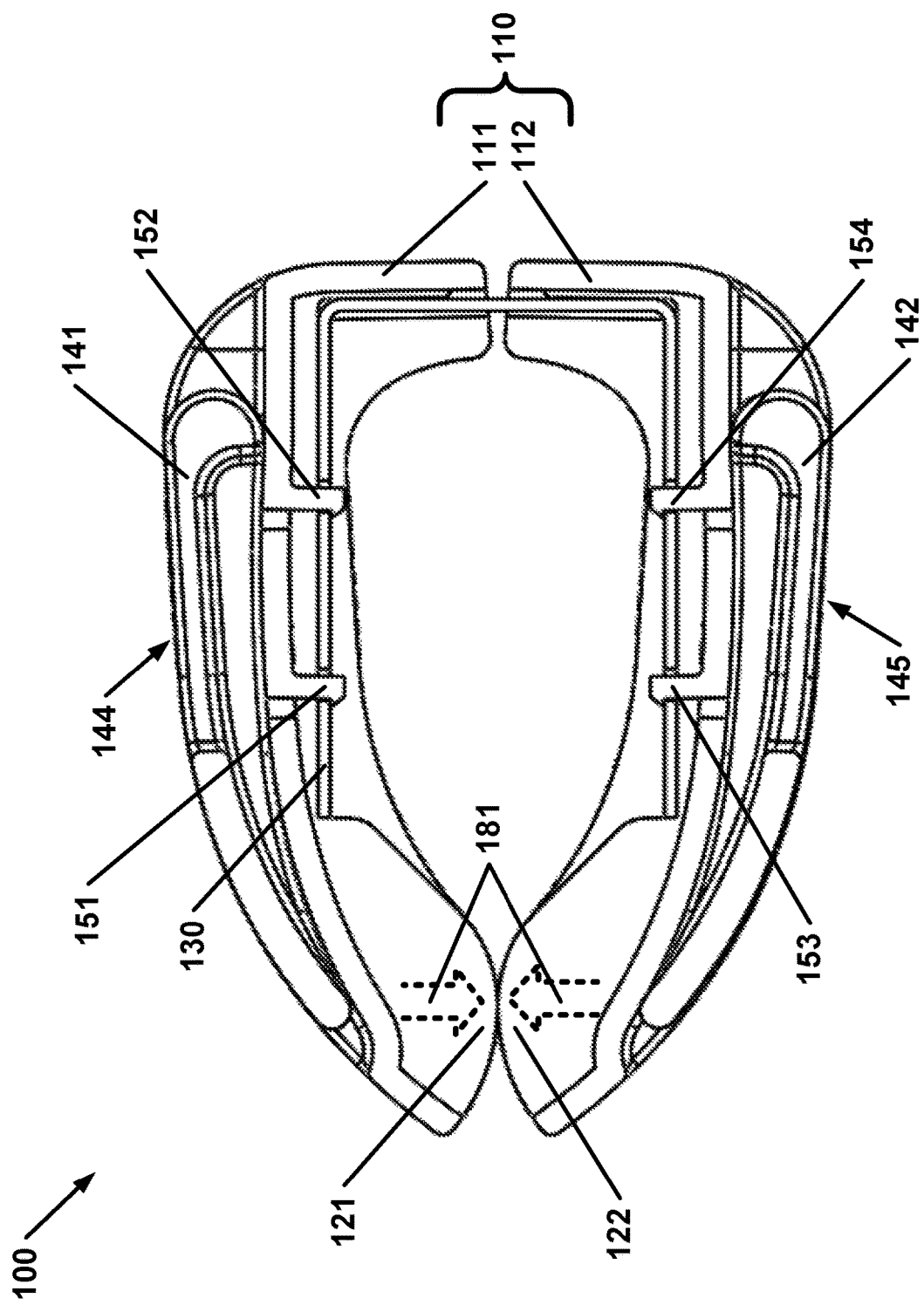
FIG. 5 is a cross-section side view of an example clamp showing a first clamping surface, a second clamping surface, a shell, and a first arm and a second arm in a non-extended position as per an aspect of a disclosed embodiment.
Figure 6:
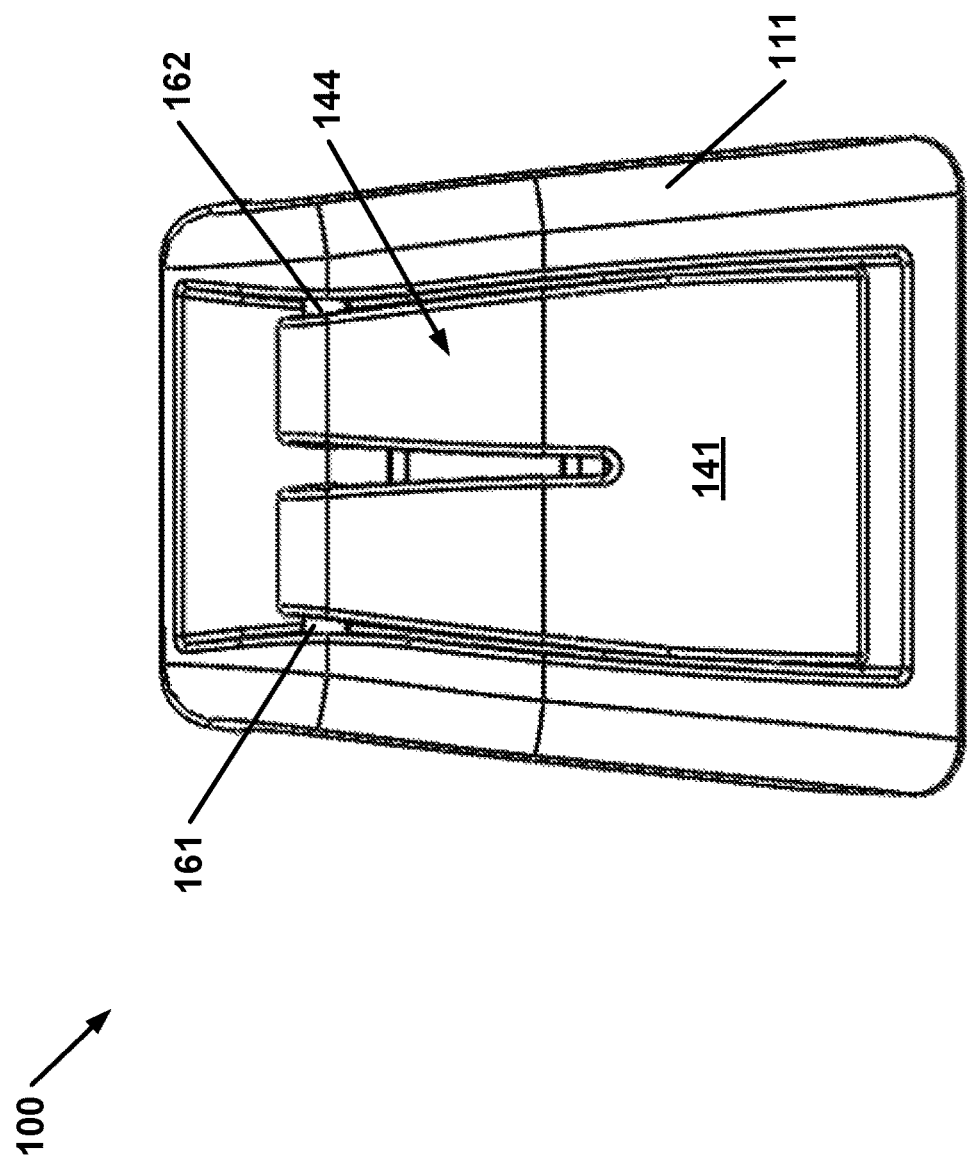
FIG. 6 is a top view of an example clamp showing a first shell portion, a pivotal connection, and a first arm in a non-extended position as per an aspect of a disclosed embodiment.
Figure 7:
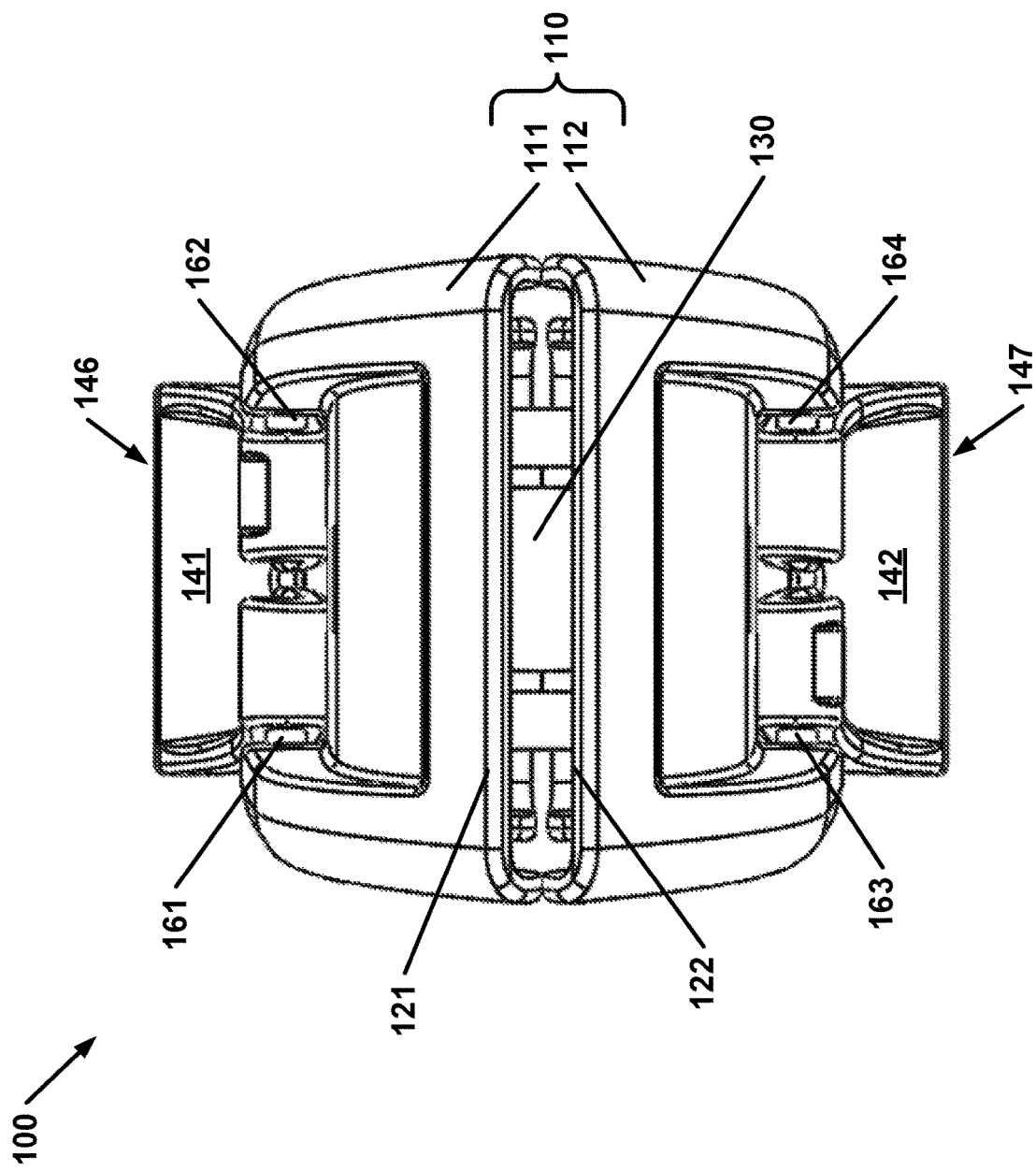
FIG. 7 is a front view of an example clamp showing a first clamping surface, a second clamping surface, and a first arm and second arm in an extended position as per an aspect of a disclosed embodiment.
Figure 8:
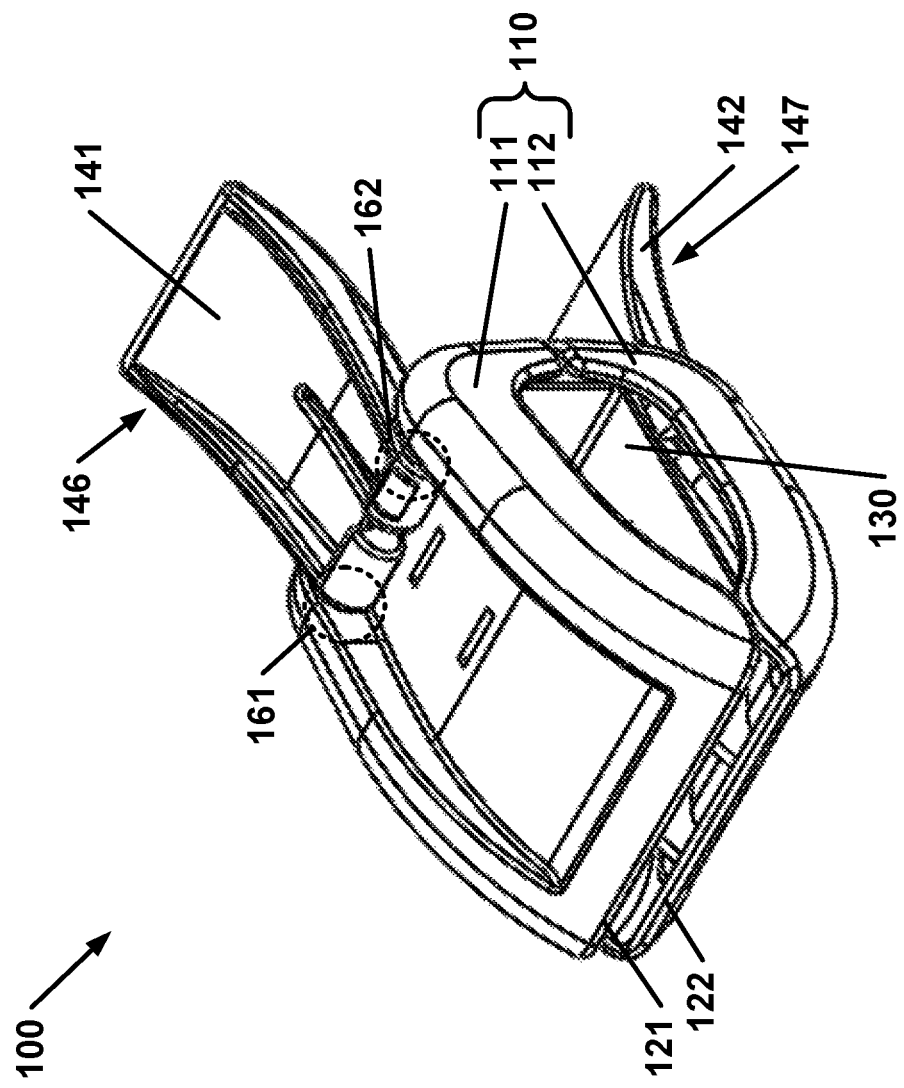
FIG. 8 is an isometric side view of an example clamp showing a first clamping surface, a second clamping surface, and a first arm and a second arm in an extended position as per an aspect of a disclosed embodiment.
Figure 9:
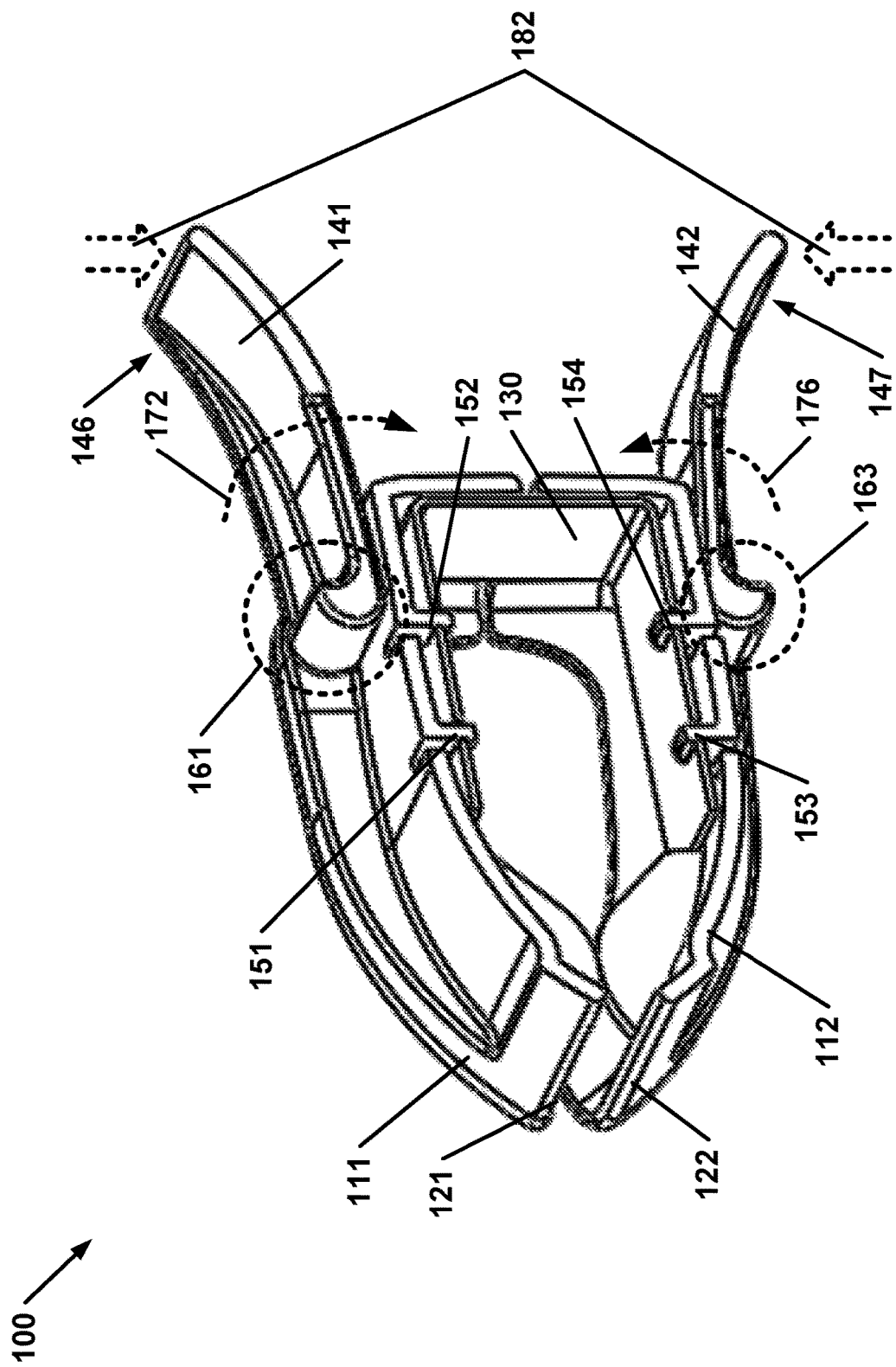
FIG. 9 is an isometric side, cross-section view of an example clamp showing a first clamping surface, a second clamping surface, and a first arm and a second arm in an extended position as per an aspect of a disclosed embodiment.
Figure 10:
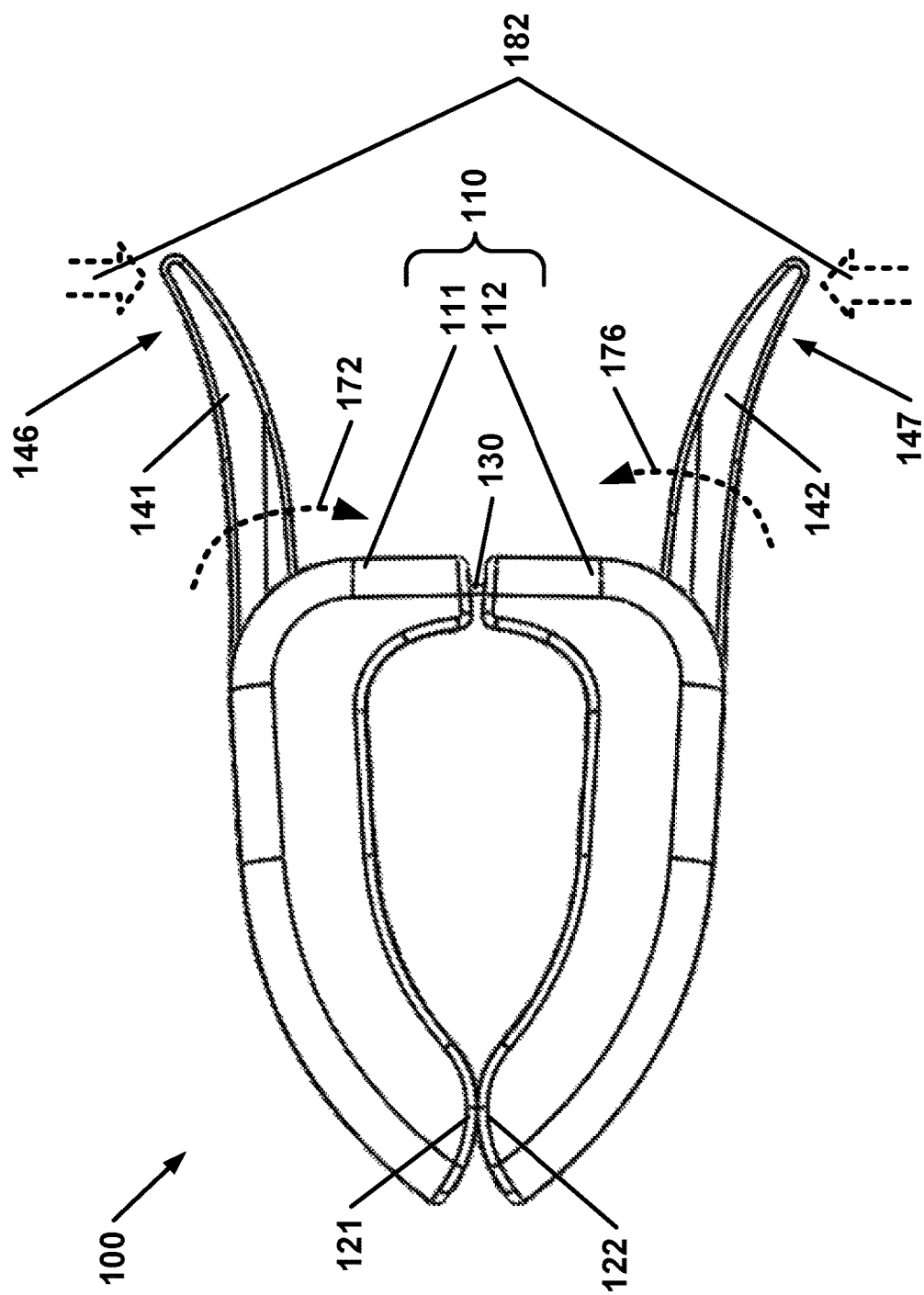
FIG. 10 is an external side view of an example clamp showing a first clamping surface and a second clamping surface in a first clamping position, a shell, and a first arm and a second arm in an extended position as per an aspect of a disclosed embodiment.
Figure 11:
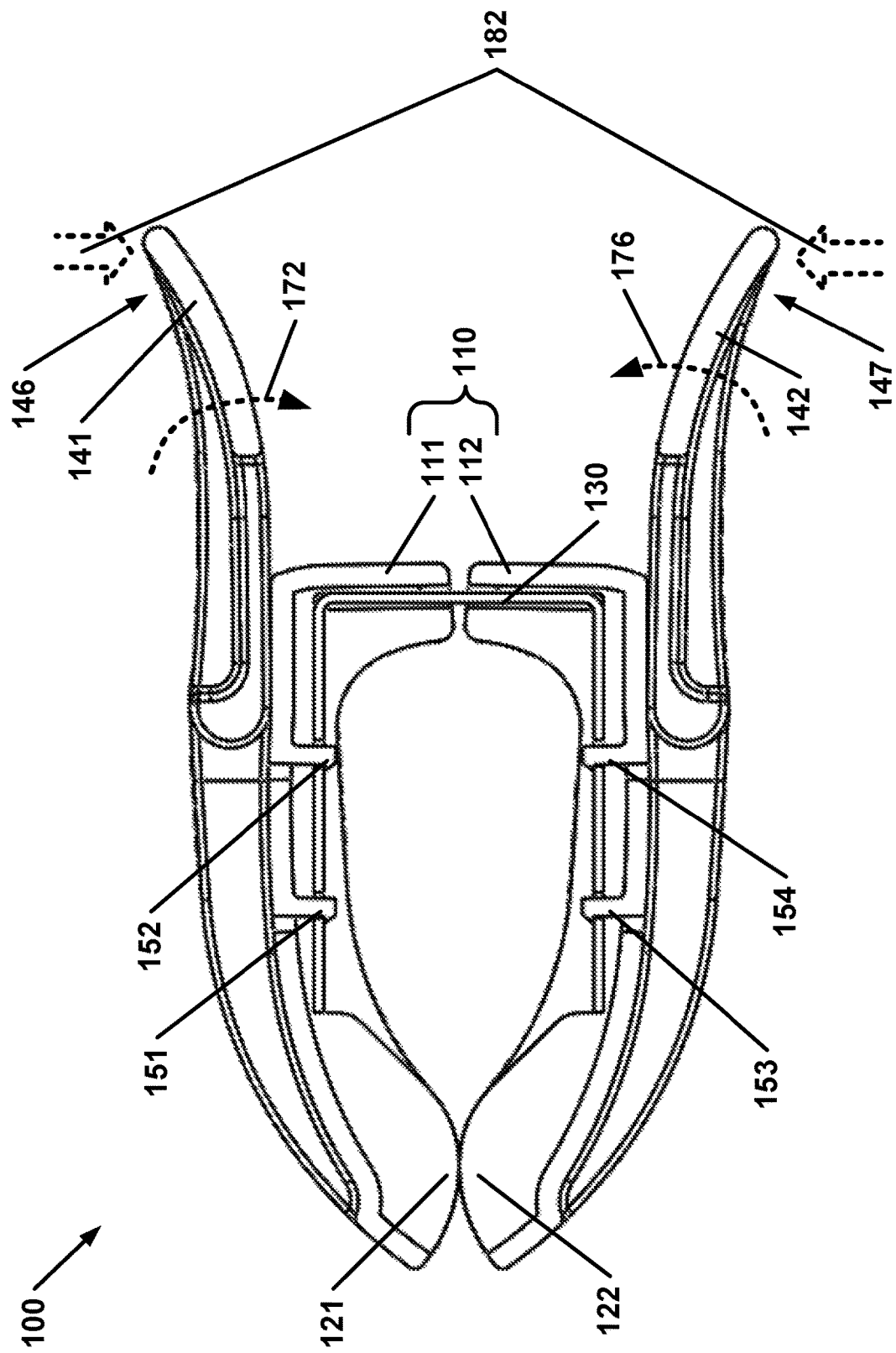
FIG. 11 is a cross-section, side view of an example clamp showing a first clamping surface, a second clamping surface, a shell, and a first arm and a second arm in an extended position as per an aspect of a disclosed embodiment.
Figure 12:
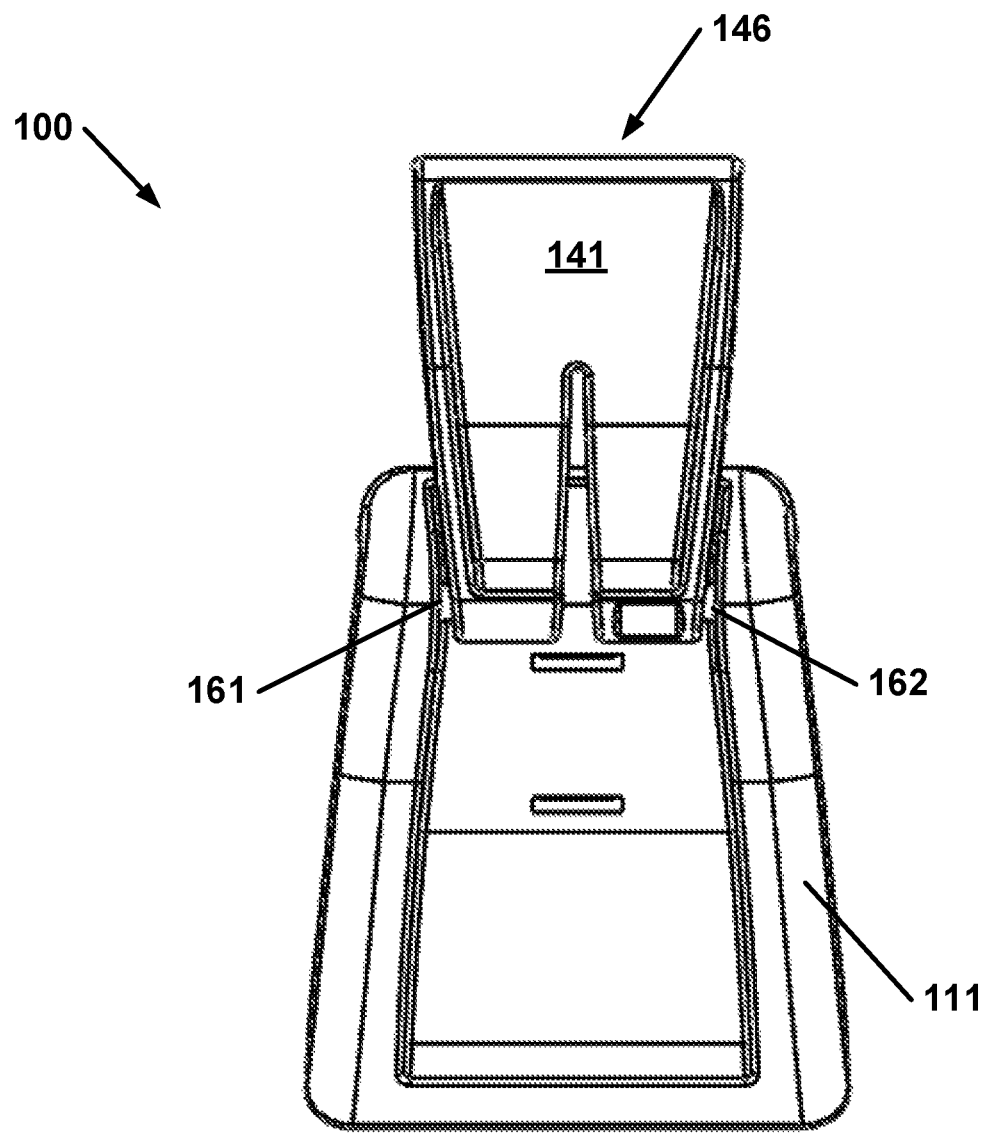
FIG. 12 is a top view of an example clamp showing a first shell portion, a pivotal connection, and a first arm in a non-extended position as per an aspect of a disclosed embodiment.

When the first arm 141 is in the first arm non-extended position 144, the first arm 141 may be surrounded, at least in part, by the first shell portion 111. The first arm 141 being at least partially surrounded by the first shell portion 111 may prohibit the first arm 141 from getting caught on, for example, other articles of clothing when the device is employed in a washing or drying machine. The first arm extended position 146 may extend the first arm outward from the first shell portion 111. Examples of the first arm 141 and the second arm 142 in the first arm extended position 146 and second arm extended position 147 are shown in FIG. 8 and FIG. 9. Examples of the first arm 141 and the second arm 142 in the first arm non-extended position 144 and second arm non-extended position 145 are shown in FIG. 2 and FIG. 5.

The second arm 142 may comprise a second arm extended position 147 and a second arm non-extended position 145. The second arm 142 may be pivotably connected at pivotal connection 163 and 164 to the second shell portion 112. The second arm 142 may be connected to the second shell portion 112 by a pivotal connection 163 and 164, such as a pin or hinge, affixed to the second shell portion 112. The pivotal connection may allow the second arm 142 to rotate outward from the second shell portion 112. In the second arm non-extended position 145, the second arm 142 may be surrounded, at least in part, by the second shell portion 112. The second arm non-extended position 145 may be complimentary to the first arm 141 in the first arm non-extended position 144. The second arm 142 being at least partially surrounded by the second shell portion 112 may prohibit the second arm from getting caught on for example, other articles of clothing when the device is employed in a washing or drying machine. The second arm extended position 147 may extend the second arm 142 outward from the second shell portion 112. The second arm extended position 147 may be complimentary to the first arm 141 in the first arm extended position 146.

An external force 182 applied to the first arm 141 in the first arm extended position 146 and the second arm 142 in the second arm extended position 147 may urge the first clamping surface 121 and the second clamping surface 122 to separate. When the first clamping surface 121 and second clamping surface 122 are separated, it may allow for example, clothing to be inserted between the clamping surfaces. The external force 182 may be applied to the first arm 141 and the second arm 142 to bring a non-pivoting portion of the first arm 141 to a non-pivoting portion of the second arm 142. The external force 182 may be applied to create a large enough separation between the first clamping surface 121 and the second clamping surface 122 to allow a user to insert for example, the portions of the garment desired to be kept together.

Figure 13A:
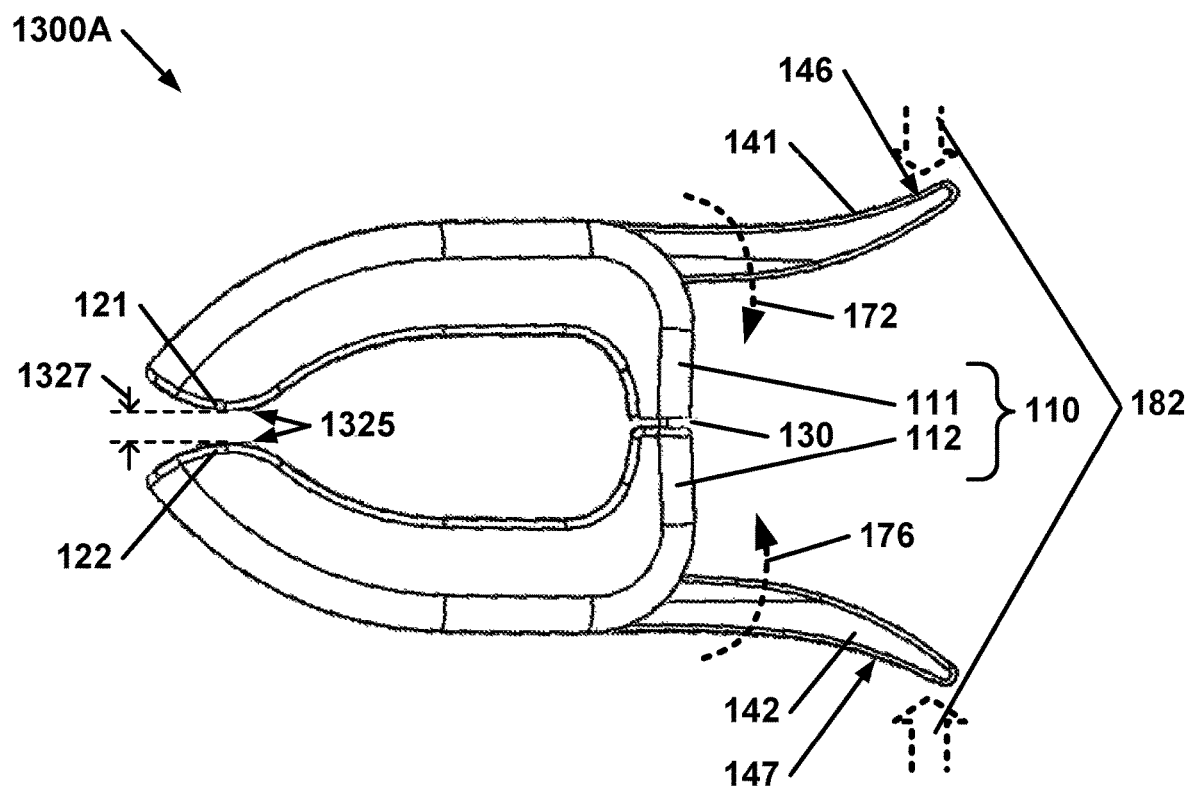
FIG. 13A and FIG. 13B illustrate example clamping positions of a clamp as per an aspect of a disclosed embodiment.
Figure 13B:
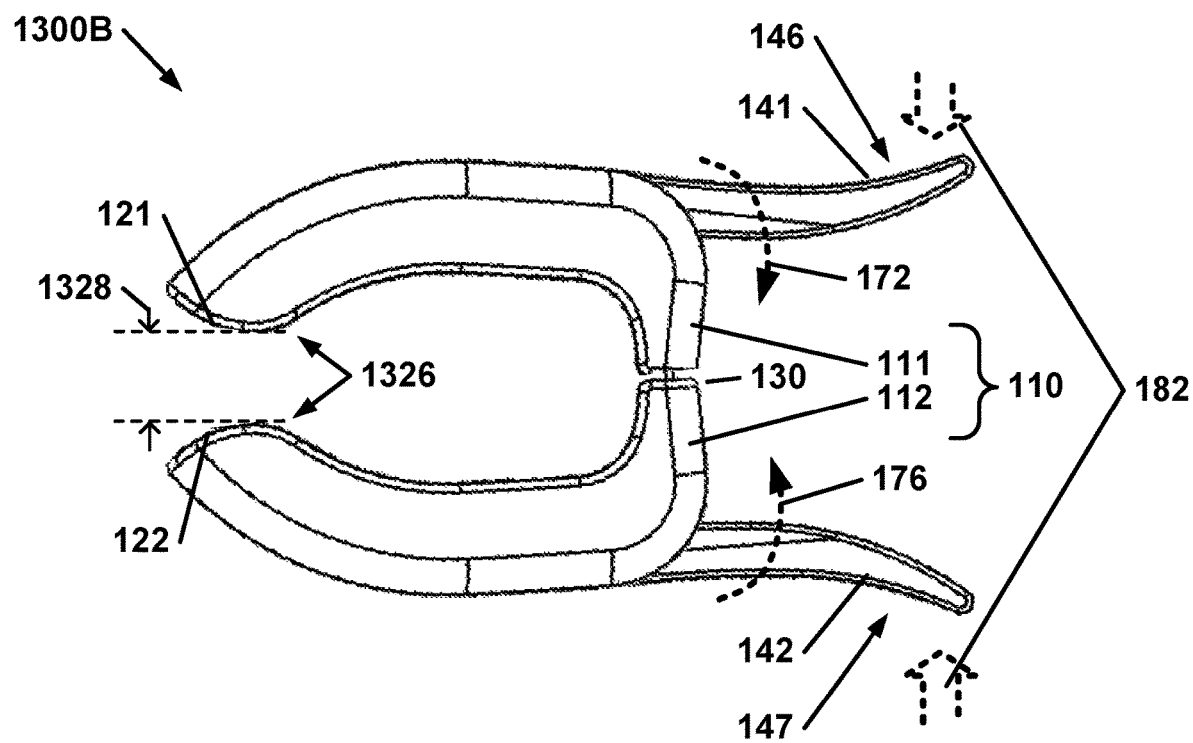

FIG. 13A and FIG. 13B illustrate an embodiment of a clamp with at least two clamping positions. Clamp 1300A illustrates first clamping position 1325 and clamp 1300B illustrates second clamping position 1326. The external force 182 applied to the first arm 141 in the first arm extended position 146 and the second arm 142 in the second arm extended position 147, may move the first clamping surface 121 and the second clamping surface 122 from a first clamping position 1325 to a second clamping position 1326. While in the first clamping position 1325, the first clamping surface 121 and the second clamping surface 122 are at a first distance 1327. While in the second clamping position 1326, the first clamping surface 121 and the second clamping surface 122 are at a second distance 1328. The first distance 1327 may be configured to clamp various materials. For example, when configured to clamp certain materials, the first distance 1327 may be less than 5 mm. In an alternative example, when configured to clamp other certain materials, the first distance 1327 may be less than 10 mm. In yet another alternative example, when configured to clamp larger materials, the first distance 1327 may be greater than 100 mm. The second distance 1328 is greater than the first distance 1327.

Figure 14:
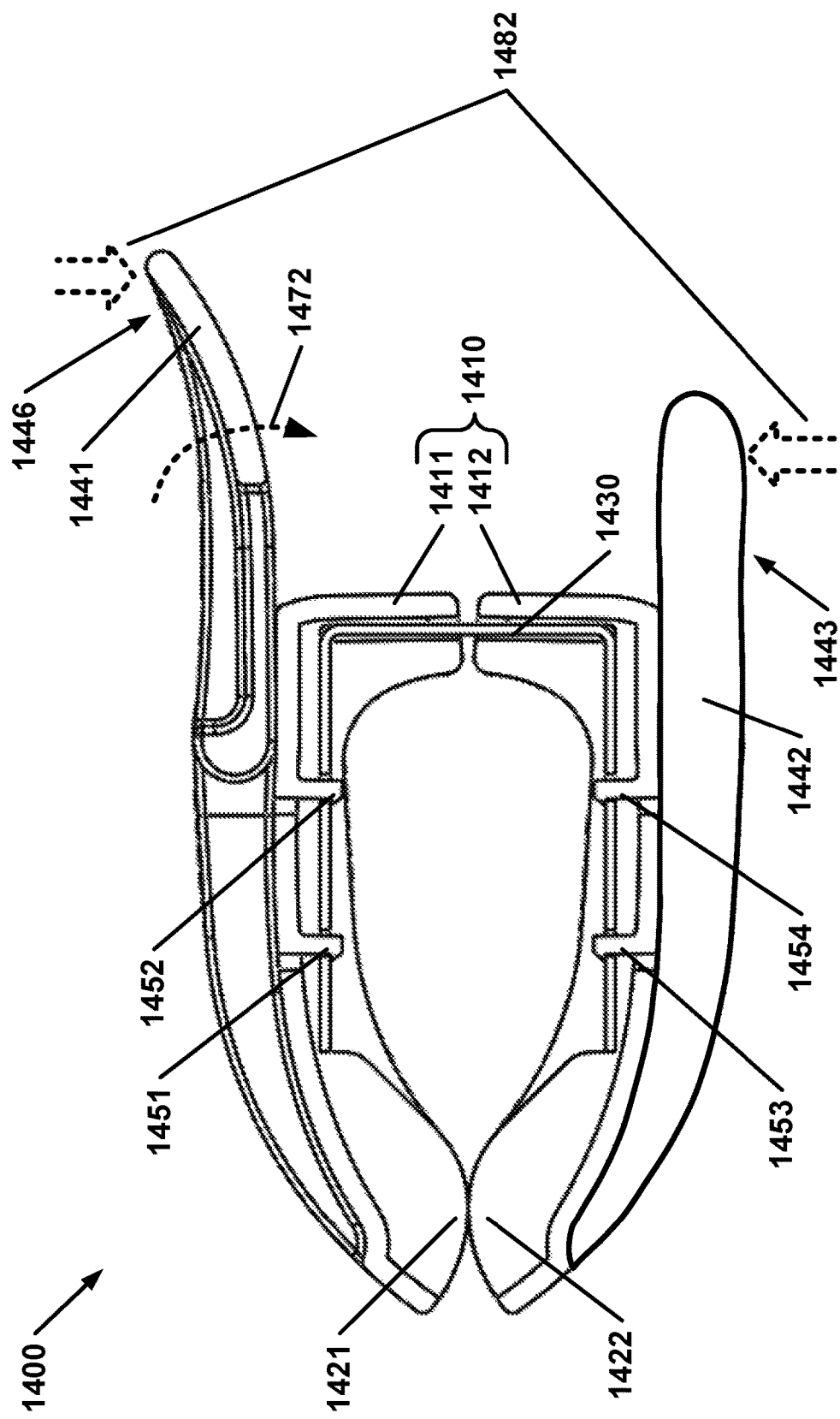
FIG. 14 is a cross-section side view of an example clamp with the first arm in an extended position and the second arm in a fixed position as per an aspect of a disclosed embodiment.

FIG. 14 illustrates an embodiment of clamp 1400 where the second arm 1442 may not be pivotably connected to the shell 1410. The second arm 1442 may have a fixed position 1443 that extends from the shell 1410. In this embodiment, the second arm 1442 in the fixed position 1443 is stationary relative to the second shell portion 1412. The second arm 1442 in the fixed position 1443 can be of varying length and width, so long as it is extended from the shell 1410.

The shell 1410 may comprise a portion of the device where spring 1430, first arm 1441, and/or second arm 1442 attach. The shell 1410 may comprise a first shell portion 1411, a first clamping surface 1421, a second shell portion 1412, and a second clamping surface 1422. The shell 1410 may be comprise a portion configured to come in contact with, for example, a garment. The first shell portion 1411 and the second shell portion 1412 to move from a first clamping position to a second clamping position when an external force 1482 is applied. The shell 1410 may comprise at least one tab (for example, tab 1451, tab 1452, tab 1453 and/or tab 1454) configured to hold the spring 1430 in contact with the shell 1410. The first arm 1441 may move from the first arm non-extended position to the first arm extended position 1446 via first arm movement 1472.

Figure 15:
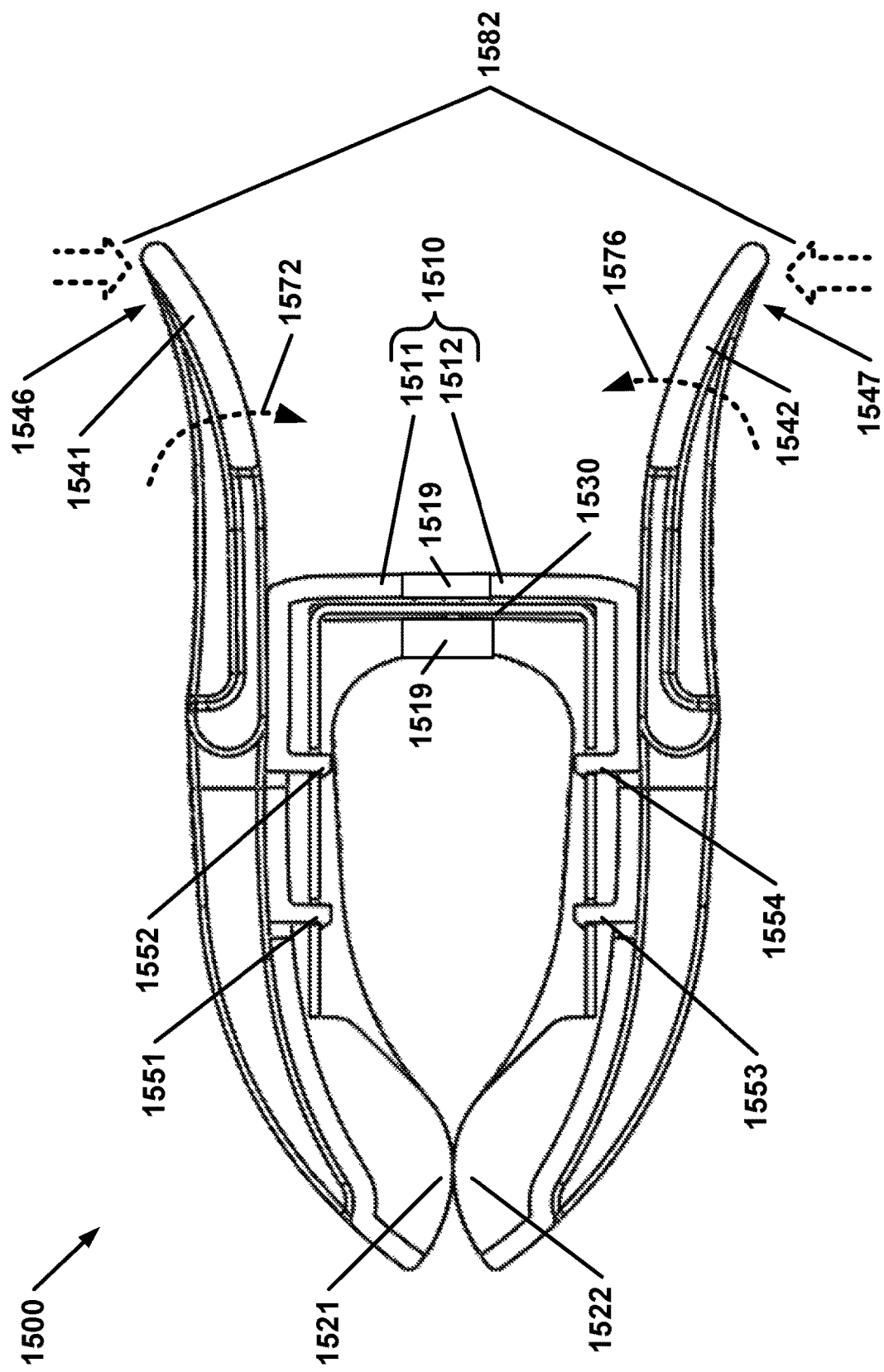
FIG. 15 is a cross-section side view of an example clamp showing a first clamping surface, a second clamping surface, a flexible portion, a shell, and a first arm and a second arm in an extended position as per an aspect of a disclosed embodiment.

FIG. 15 illustrates an embodiment of a clamp 1500 where first shell portion 1511 may be disposed to the second shell portion 1512 using a flexible portion 1519. The flexible portion may allow the first shell portion 1511 and the second shell portion 1512 to move from a first clamping position to a second clamping position when an external force 1582 is applied. The flexible portion 1519 may be solid. The flexible portion 1519 may comprise multiple pieces. The shell 1510 may comprise one member where the flexible portion 1519 connects the first shell portion 1511 and the second shell portion 1512.

The shell 1510 may comprise a portion where the spring 1530, first arm 1541, and/or second arm 1542 are attached. The shell 1510 may comprise a first shell portion 1511, a first clamping surface 1521, a second shell portion 1512, and a second clamping surface 1522. The shell 1510 may comprise a portion configured to come in contact with, for example, a garment. The shell 1510 may comprise at least one tab (for example, tab 1551, tab 1552, tab 1553 and/or tab 1554) configured to hold the spring 1530 in contact with the shell 1510. The first arm 1541 may move from the first arm non-extended position to the first arm extended position 1546 via first arm movement 1572. The second arm 1542 may move from the second arm non-extended position to the first arm extended position 1547 via first arm movement 1576.

Figure 16:
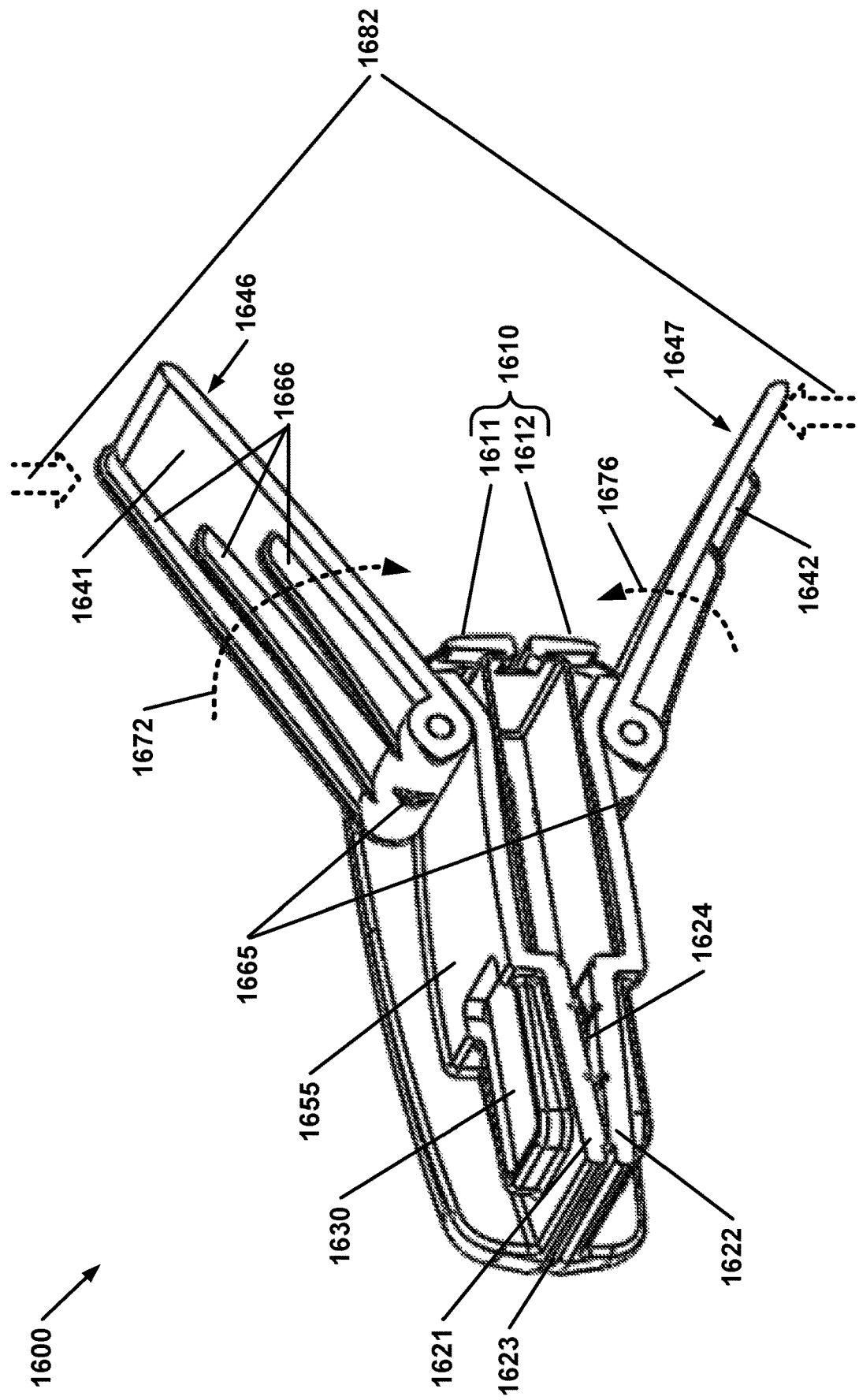
FIG. 16 is an isometric side, cross-section view of an example clamp, showing textured clamping surfaces, with a first arm and a second arm in an extended position as per an aspect of a disclosed embodiment.

FIG. 16 illustrates an embodiment of a clamp 1600 with a streamlined profile. According to an embodiment, the spring 1630 may also be structurally configured to attach to the shell 1610 by spring mounts 1655 that allow the spring 1630 to move within the mount when the device is employed. A spring mount 1655 may be integrated into the shell 1610. The spring mount 1655 may be a separate piece from the shell 1610. The spring mount 1655 may be built into the first shell portion 1611 and second shell portion 1612.

According to an embodiment, the first clamping surface 1621 and the second clamping surface 1622 may be covered with a first textured surface 1623 and second textured surface 1624 that comprises a softness and/or flexibility that is greater than at least some other materials of the shell 1610. The textured surfaces 1623 and 1624 may comprise raised bumps in the shape of, for example, polygons or semi-circles. The textured surfaces 1623 and 1624 may comprise raised ridges in geometric patterns of, for example, polygons or circular patterns. The textured surfaces 1623 and 1624 may comprise rubber, plastic, metal, silicone, a combination thereof, and/or similar materials. The textured surfaces 1623 and 1624 may comprise a material such as polypropylene copolymer. The textured surfaces 1623 and 1624 may be adapted to conform to the shape of clamped item(s). The textured surfaces 1623 and 1624 may be configured with a complementary shape of clamped item(s). The textured surfaces 1623 and 1624 may be configured to hold, for example, a garment securely without destroying or harming the integrity of the garment.

According to an embodiment, a cam 1665 feature on the first arm 1641 and the second arm 1642 may hold the first arm 1641 and the second arm 1642 in the first arm non-extended position and second arm non-extended position. When the first arm 1641 is in the first arm non-extended position and the second arm 1642 is in the second arm non-extended position, the first arm 1641 and/or second arm 1642 may be locked in place by the use of at least one cam 1665. Locking the first arm 1641 and second arm 1642 in the non-extended positions may prohibit the first arm 1641 and the second arm 1642 from moving out of the non-extended positions when the device is utilized in, for example, a washing or drying machine.

According to an embodiment, at least one rib 1666 feature on the first arm 1641 and/or the second arm 1642 may be used for structural support. Depending on material of the first arm 1641 and/or second arm 1642, embodiments may employ structural reinforcement and/or structure. An example of a reinforcement is illustrated as rib(s) 1666. It is envisioned that other reinforcement structures may be employed to, for example, stiffen an arm. Other structural reinforcement may employ lamination of materials, and/or encapsulation of structural materials (for example, steel and/or carbon composite).

Figure 17A:
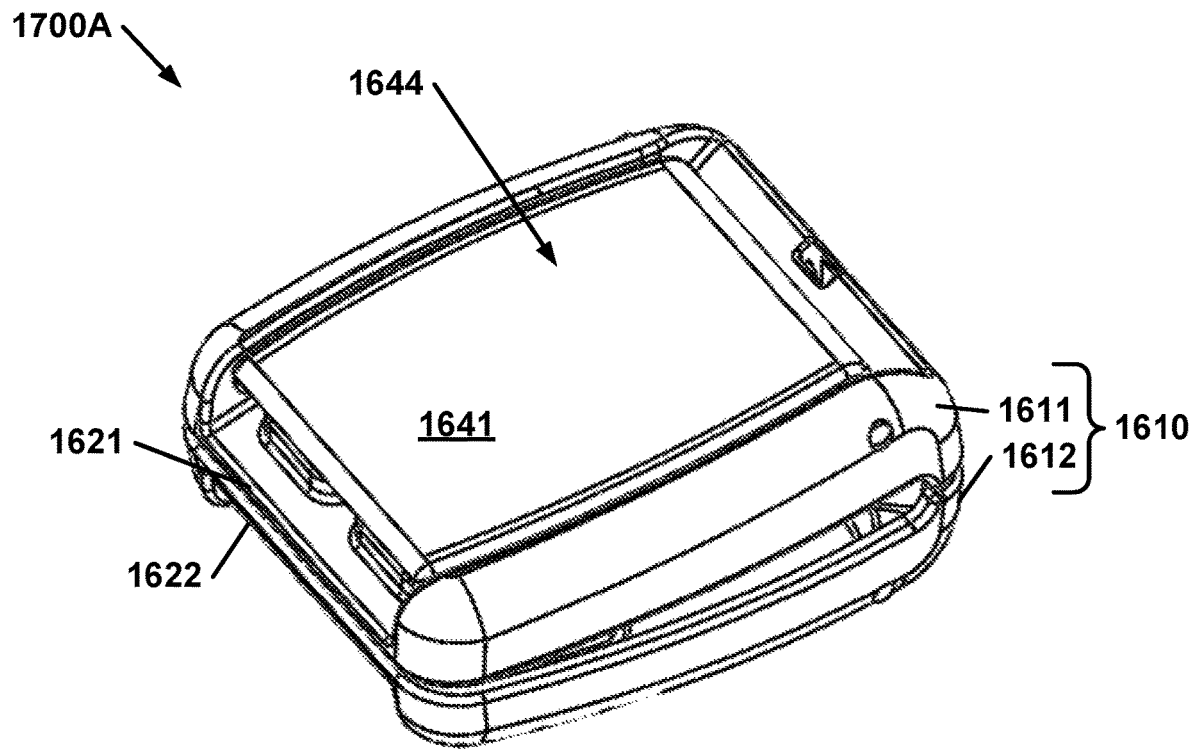
FIG. 17A is an isometric view of an example clamp with non-extended arms as per an aspect of a disclosed embodiment.
Figure 17B:
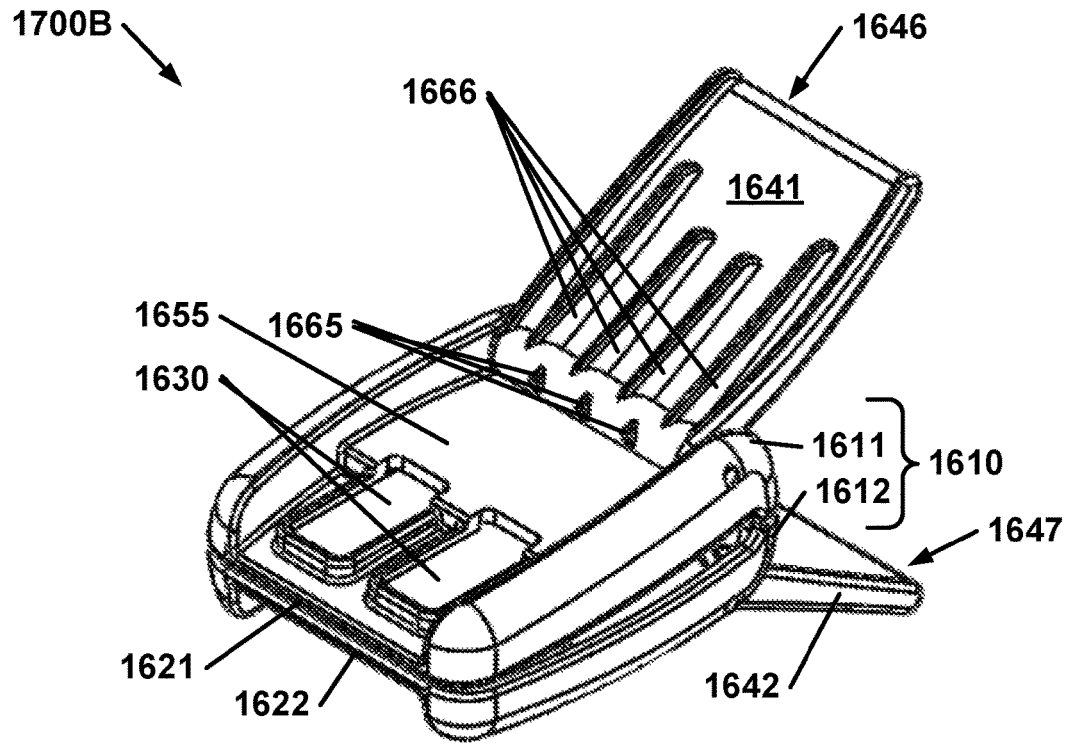
FIG. 17B is an isometric view of an example clamp with extended arms as per an aspect of a disclosed embodiment.

The first arm 1641 may move from the first arm non-extended position 1644 to the first arm extended position 1646 via first arm movement 1672. The second arm 1642 may move from the second arm non-extended position to the first arm extended position 1647 via first arm movement 1676. An external force 1682 applied to the first arm 1641 in the first arm extended position 1646 and the second arm 1642 in the second arm extended position 1647 may urge the first clamping surface 1621 and the second clamping surface 1622 to separate FIG. 17A is an isometric view of an example clamp 1700A with non-extended arms as per an aspect of a disclosed embodiment. FIG. 17B is an isometric view of an example clamp 1700B with extended arms as per an aspect of a disclosed embodiment. These figures are presented to enhance the understanding of the description above with reference to FIG. 16.

FIG. 18 shows an example process for using an embodiment of a clamp (for example, as illustrated in FIG. 16, FIG. 17A, and FIG. 17B). At 1810, a first arm (for example, 1641) may be rotated into the first arm extended position (for example, 1646). A second arm (for example, 1642) may be rotated into a second arm extended position (for example, 1647). At 1820, an external force (for example, 1682) may be applied to the first arm (for example, 1641) and the second arm (for example, 1642) to separate a first clamping surface (for example, 1621) from a second clamping surface (for example, 1622). At 1830, material may be inserted between the first clamping surface (for example, 1621) and the second clamping surface (for example, 1622). At 1840, the external force (for example, 1682) applied to the first arm (for example, 1641) and the second arm (for example, 1642) may be released. At 1850, the first arm (for example, 1641) may be rotated into the first arm non-extended position (for example, 1646) and the second arm (for example, 1642) may be rotated into the second arm non-extended position (for example, 1645).

Figure 19:
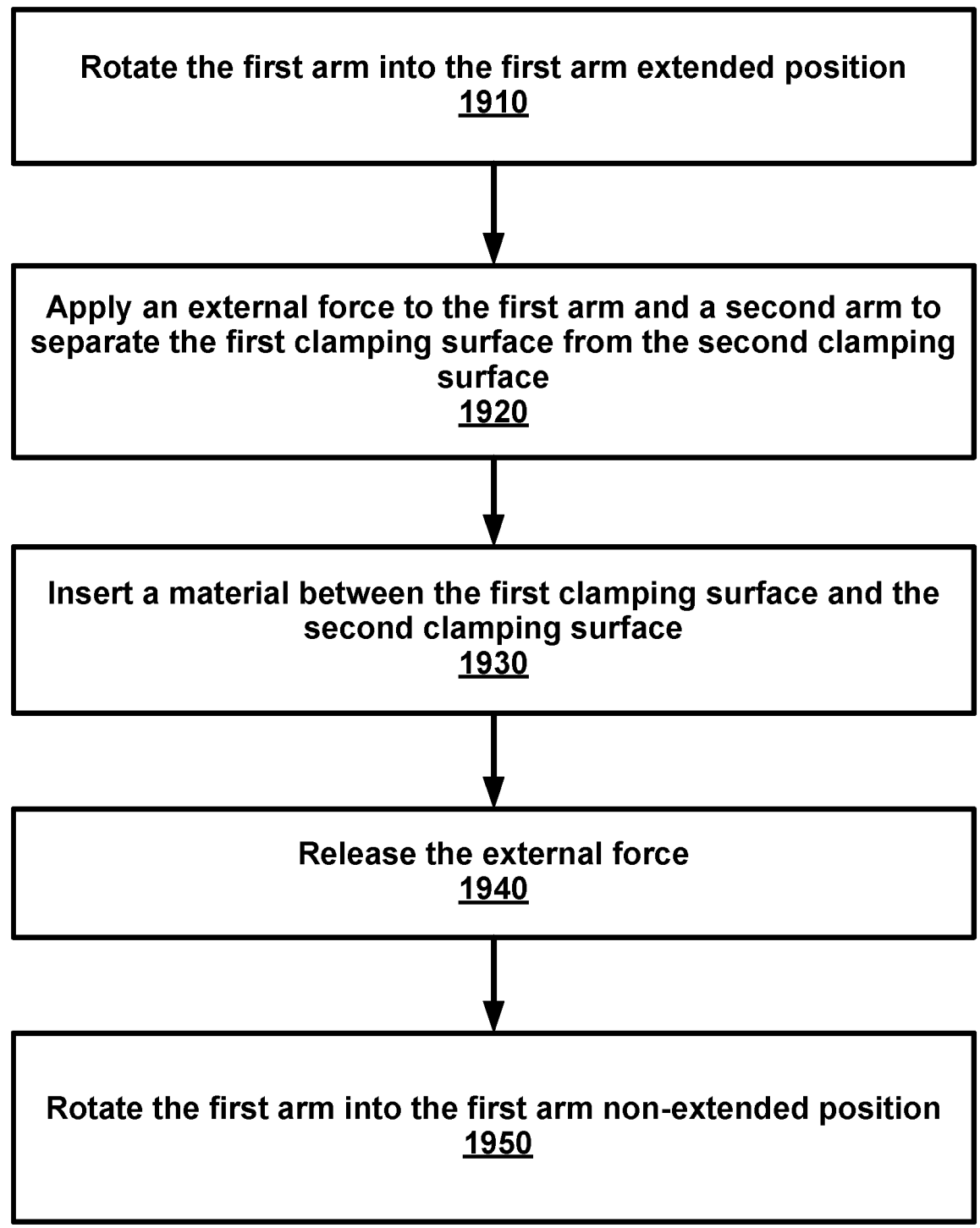
FIG. 19 is a flow diagram of a method of using a clamp as per an aspect of a disclosed embodiment.

FIG. 19 shows an example process for using an embodiment of a clamp (for example, as illustrated in FIG. 14). At 1910, a first arm (for example, 1441) may be rotated into the first arm extended position (for example, 1446). At 1920, an external force (for example, 1482) may be applied to the first arm (for example, 1441) and the second arm (for example, 1442) to separate a first clamping surface (for example, 1421) from a second clamping surface (for example, 1422). At 1930, material may be inserted between the first clamping surface (for example, 1421) and the second clamping surface (for example, 1422). At 1940, the external force (for example, 1482) applied to the first arm (for example, 1441) and the second arm (for example, 1442) may be released. At 1950, the first arm (for example, 1441) may be rotated into the first arm non-extended position.

According to additional embodiment, a first arm may move from a first arm non-extended position to a first arm extended position by sliding out from the first shell portion. The second arm may move from a second arm non-extended position to a second arm extended position by sliding out from the second shell portion.

An example embodiment may also be employed, for example, in woodworking, keepings pairs of socks together, to close open bags of food, and for other laundry applications. The ability of the first arm and second arm to rotate to become recessed within the shell 110 of the clamp 100 may allow the clamp 100 to take up less space and may prohibit the first arm 141 and second arm 142 from getting caught on items adjacent to the items being clamped. For example, in the woodworking context, the ability to rotate the first arm 141 and the second arm 142 inward may prevent the clamp 100 from damaging other materials being used in the project that would have to be replaced if damaged.

A device may comprise a shell, a first clamping surface, a second clamping surface, a first arm, and a second arm. The shell may comprise: a first shell portion; and a second shell portion. The first clamping surface may be disposed at an end of the first shell portion. The second clamping surface may be disposed at an end of the second shell portion. The first arm may comprise a first arm non-extended position. The first arm and the first shell portion may comprise a first outer surface. The first arm may comprise a first arm extended position. The first arm may extend, at least in part, away from the first shell portion. The second arm may comprise a second arm extended position. The second arm may extend, at least in part, away from the second shell portion. The first shell portion may be disposed to the second shell portion such that the first clamping surface and the second clamping surface separate in response to an external force. The external force may be applied to the first arm in the first arm extended position. The external force may be applied to the second arm in the second arm extended position.

According to an example embodiment, the first arm may be recessed in the first shell portion when in the first arm non-extended position. According to an example embodiment, the second arm may further comprise a second arm non-extended position. The second arm in the second arm non-extended position and the second shell portion may comprise a second outer surface. According to an example embodiment, the first shell portion and the second shell portion may be substantially similar.

According to an example embodiment, a first clamping surface and a second clamping surface may be urged toward one another by an internal force so that the first clamping surface and the second clamping surface are held adjacent to each other. According to an example embodiment, a first clamping position where the first clamping surface and the second clamping surface may be at a first distance. According to an example embodiment, a second clamping position where the first clamping surface and the second clamping surface may be at a second distance that is greater than the first distance. According to an example embodiment, the first distance may be less than 5 mm According to an example embodiment, the first clamping surface and the second clamping surface may be softer than a portion of the shell.

According to an example embodiment, at least one of thae first clamping surface and a second clamping surface may comprise a textured surface. According to an example embodiment, textured surface may comprise polypropylene copolymer.

According to an example embodiment, an internal force may be caused by an elastic member. According to an example embodiment, the internal force may be caused by a mechanical resistance of the shell. According to an example embodiment, the internal force may be caused by a spring. According to an example embodiment, the internal force may be caused by a spring. The spring may comprise a compression spring. The spring may comprise a torsional spring. The spring may comprise a leaf spring. According to an example embodiment, the internal force may be caused by a spring attached to at least one of the first shell portion and the second shell portion. The spring may be attached using a tab. The spring may be attached using a mount. The spring may be attached using a screw. The spring may be attached using an adhesive. The spring may be attached using a bolt. According to an example embodiment, a source of the internal force may be enclosed by the first shell portion and the second shell portion.

According to an example embodiment, a first shell portion may be disposed to a second shell portion employing a hinge. The first shell portion may be disposed to the second shell portion employing a spring. The first shell portion may be disposed to the second shell portion employing a flexible portion. The first shell portion may be disposed to the second shell portion employing a pin.

According to an example embodiment, a first arm may further comprise a first arm intermediate position between a first arm non-extended position and a first arm extended position. According to an example embodiment, the first arm may be rotatable between the first arm non-extended position and the first arm extended position. According to an example embodiment, a second arm may be rotatable between a second arm non-extended position and a second arm extended position. According to an example embodiment, the first arm may be pivotably connected to the first shell portion employing a pin. According to an example embodiment, the first arm may be pivotably connected to the first shell portion employing a hinge. According to an example embodiment, the shell may comprise one member. According to an example embodiment, the device may further comprise a first cam configured to lock the first arm in the first arm non-extended position.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The term "comprising" should be interpreted as meaning "including, but not limited to."

In this disclosure, various embodiments are disclosed. Limitations, features, and/or elements from the disclosed example embodiments may be combined to create further embodiments within the scope of the disclosure.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on utilizing the clamp 100 to keep bra pads in place while the bra goes through a washing or drying machine. However, one skilled in the art will recognize that embodiments of the invention may also be implemented to hold other items together for a variety of purposes, such as for example, holding parts stationary while assembling a multi-part structure.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A device comprising:
   A) a shell comprising:
      i) a first shell portion; and
      ii) a second shell portion;
   B) a first clamping surface disposed at an end of the first shell portion;
   C) a second clamping surface disposed at an end of the second shell portion;
   D) a first arm, comprising:
      i) a first arm non-extended position, wherein the first arm is recessed fully in the first shell portion to form a first outer surface; and
      ii) a first arm extended position, wherein the first arm extends, at least in part, away from the first shell portion; and
   E) a second arm comprising a second arm extended position, wherein the second arm extends, at least in part, away from the second shell portion; and
   F) wherein the first shell portion is disposed to the second shell portion such that the first clamping surface and the second clamping surface separate in response to an external force applied to:
      i) the first arm in the first arm extended position; or
      ii) the second arm in the second arm extended position.

2. The device according to claim 1, where the second arm further comprises a second arm non-extended position, wherein the second arm in the second arm non-extended position is recessed fully in the second shell portion to form a second outer surface.

3. The device of claim 2, wherein the first shell portion and the second shell portion are substantially similar.

4. The device of claim 3, wherein the first clamping surface and the second clamping surface are urged toward one another by an internal force so that the first clamping surface and the second clamping surface are held adjacent to each other.

5. The device of claim 4, further comprising:
   A) a first clamping position where the first clamping surface and the second clamping surface are at a first distance; and
   B) a second clamping position where the first clamping surface and the second clamping surface are at a second distance that is greater than the first distance.

6. The device of claim 5, wherein the first distance is less than 5 mm.

7. The device of claim 6, wherein the first clamping surface and the second clamping surface are softer than a portion of the shell.

8. The device of claim 7, wherein at least one of the first clamping surface and the second clamping surface comprises a textured surface.

9. The device of claim 8, wherein textured surface comprises polypropylene copolymer.

10. The device of claim 4, wherein the internal force is caused by at least one of:
   A) an elastic member;
   B) a mechanical resistance of the shell; or
   C) a spring.

11. The device of claim 4, wherein the internal force is caused by a spring, the spring comprising at least one of:
   A) a compression spring;
   B) a torsional spring; or
   C) a leaf spring.

12. The device of claim 4, wherein the internal force is caused by a spring attached to at least one of the first shell portion and the second shell portion using at least one of:
   A) a tab;
   B) a mount;
   C) a screw;
   D) an adhesive; or
   E) a bolt.

13. The device of claim 4, wherein a source of the internal force is enclosed by the first shell portion and the second shell portion.

14. The device of claim 1, wherein the first shell portion is disposed to the second shell portion employing at least one of:
   A) a hinge;
   B) a spring;
   C) a flexible portion; or
   D) a pin.

15. The device of claim 2, wherein the first arm is rotatable between the first arm non-extended position and the first arm extended position.

16. The device of claim 15, wherein the second arm is rotatable between the second arm non-extended position and the second arm extended potion.

17. The device of claim 15, wherein the first arm is pivotably connected to the first shell portion employing at least one of:
   A) a pin; or
   B) a hinge.

18. The device of claim 1, wherein the shell comprises one member.

19. The device of claim 1, further comprising a first cam configured to lock the first arm in the first arm non-extended position.

* * * * *